J. S. MURCHISON.
ANIMAL POKE.
APPLICATION FILED MAY 3, 1912.
1,080,992.
Patented Dec. 9, 1913.
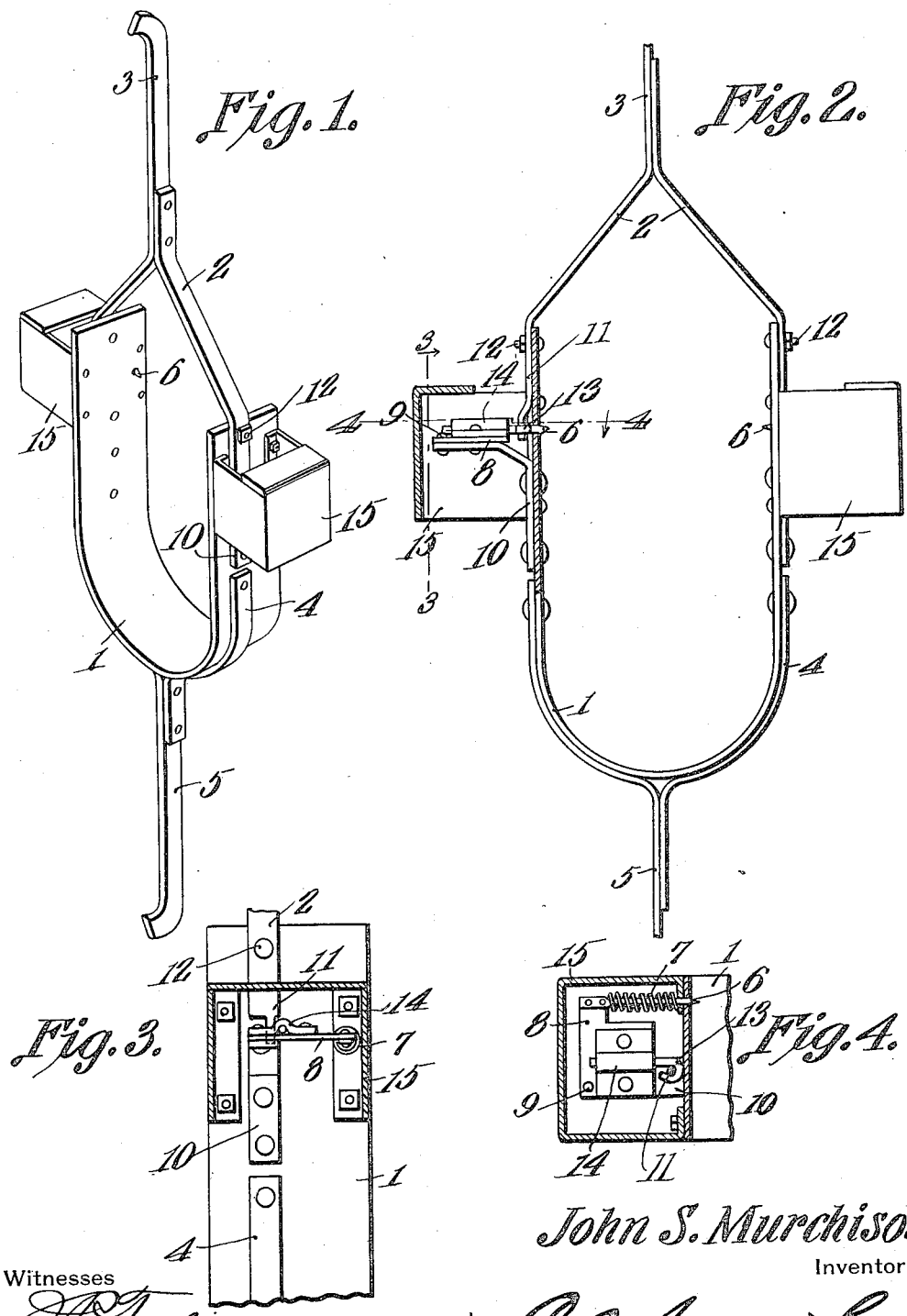
John S. Murchison,
Inventor
Witnesses
by
Attorneys

UNITED STATES PATENT OFFICE.

JOHN S. MURCHISON, OF ROCKY, OKLAHOMA.

ANIMAL-POKE.

1,080,992.  Specification of Letters Patent.  Patented Dec. 9, 1913.

Application filed May 3, 1912. Serial No. 695,000.

*To all whom it may concern:*

Be it known that I, JOHN S. MURCHISON, a citizen of the United States, residing at Rocky, in the county of Washita and State of Oklahoma, have invented a new and useful Animal-Poke, of which the following is a specification.

This invention relates to improvements in that class of devices or appliances usually termed animal pokes.

The invention has for its object to provide for hampering the action of, and preventing an animal, as a horse or the like, from forcibly contacting with, or jumping an inclosure or fence, especially when it may be "turned" loose for pasturage or grazing.

A further object is to so devise such hampering or preventive appliance as to cause the same to automatically deter such animal-action.

A still further object is to provide against the contrivance or device casually pricking the animal, as when drinking, feeding or grazing.

A still further object is to carry out the aforesaid ends in a simple, expeditious and effective manner.

The invention therefore consists of certain instrumentalities and features substantially as hereinafter fully disclosed and defined by the appended claims.

In the accompanying drawing, illustrating the preferred embodiment of my invention wherein it will be understood that various changes and modifications as to the detailed construction and arrangement of the parts without departing from the spirit thereof, Figure 1 is a perspective view of the invention; Fig. 2 is an edge-elevation thereof, partly in section, to disclose the pricking member or prod actuating means; and Fig. 3 is a section taken on line 3—3 of Fig. 2. Fig. 4 is a section taken on line 4—4 of Fig. 2.

In practising my invention I employ a suitable yoke, frame or member 1 partially of U-shape, adapted to be applied to the animal's neck, as usual in applying a contrivance or device of this character to an animal. The frame or member 1 has its upper portion preferably formed of downwardly flaring and upwardly converging bars 2, one of which is extended upwardly into an upper-end curved or bent portion or arm 3; and to the lower U-shaped portion of said member or frame 1 is secured or fixed conforming bars 4, one of which is extended downwardly into a lower-end curved or bent portion or arm 5, these arms being designed to suitably engage a fence in the attempt of the animal, wearing the contrivance or poke, to jump or forcibly contact therewith, as will be readily appreciated, and to provide for thrusting the pricking or piercing member, barb or prod into the animal, as will presently be more fully apparent.

Suitably arranged to project or work through openings in the lateral arms of the U-shaped portion of the member 1, are barbs, pricking members or pins 6 so positioned therein as to engage or prick the animal's flesh under the conditions above indicated. The pricking members or pins are held in retracted position normally by encircling helical or coiled springs 7, suitably secured in place to effect that end, preferably as shown, particularly in Fig. 4, said pins or pricking members being secured at their inner ends to angular or L-shaped members or levers 8, pivoted at their angles or elbows, as at 9, upon brackets or bars 10 outstanding from and secured to the lateral portions of the member 1, as seen in Figs. 1 and 2.

The pricking-member actuating levers are themselves actuated by supplemental levers 11 in continuation of the member 2 pivoted, as at 12, to the lateral portions or arms of the member 1, in turn actuated by the arm or bar 3 when the latter is brought into forcible contact, by the animal, with the fence or inclosure of the pasturage, as previously stated. The levers 11 are received at their lower ends within eye-forming portions of preferably J-shaped bolt-like members or pins 13 suitably fixed to the angular levers 8 as clearly seen in Figs. 1, 3 and 4, said eye-forming members being received within recessed cap-forming or clamping plates 14 secured upon plate-like portions or enlargements of the levers 8. This mechanism, including particularly the articulating or pivoting connections between the aforesaid levers and pricking members, are all suitably housed for guarding or quarantining the same against the contact thereof with any likely obstacle, as will be readily appreciated. The housing is preferably in the form of inclosures or casings 15 as clearly shown in Figs. 1, 2 and 4, which are suitably secured to the outer surfaces of the U-shaped portions of the frame or member 1.

It is apparent that, with the poke or appliance in suitably adjusted position upon the animal, in its attempt to jump the fence or inclosure or to come into contact therewith, the lower arm 5 of the member 1, which will thus be brought into contact with the fence, will provide for effecting the flexing of the arm 3, thereof, controlling the barb or pricking member actuating levers, which will accordingly result in thrusting the barbs or pricking members into the flesh of the animal and thus prove effective to deter its further efforts or attempts in that direction. The device or appliance, however, will not interfere with the animal feeding, grazing, or drinking as previously stated, it being nicely balanced in position upon the animal's neck, also it will not result to the discomfort of the animal from wearing it, as is thought to be apparent.

What is claimed is:—

1. An animal poke, including a U-shaped member having an arm, the two spaced terminals of the member being provided each with an aperture, two brackets, one connected to the outer face of each terminal of the member at a point below the aperture, a lever pivoted to each bracket, a pin connected to each lever and having its free end disposed for projection through the aperture, a spring embracing each pin and exerting a tension upon the lever to retract the pin, a clamping plate carried by each lever, a pin having an eye upon one end connected to the lever by the clamping plate, and a bridging member connected to the free ends of the U-shaped member and operably connected to the eyes of the two pins to simultaneously operate both levers to project the first pins when the U-shaped and bridging members are flexed.

2. An animal poke, including a U-shaped member having an arm, the two spaced terminals of the member being provided each with an aperture, two brackets, one connected to the outer face of each terminal of the member at a point below the aperture, a lever pivoted to each bracket, a pin connected to each lever and having its free end disposed for projection through the aperture, a spring embracing each pin and exerting a tension upon the lever to retract the pin, a clamping plate carried by each lever, a pin having an eye upon one end connected to the lever by the clamping plate, and a bridging member having two terminals pivotally connected to the extreme terminals of the U-shaped member, the extreme ends of the terminals of the last member being reduced and introduced into the eyes of the respective last mentioned pins, whereby the flexing of the U-shaped and bridging members will actuate the levers to project the first pins against the action of the springs and whereby the springs tend to hold both members in alined relation and the first pins retracted.

In testimony that I claim the foregoing as my own, I have hereto affixed my signature in the presence of two witnesses.

JOHN S. MURCHISON.

Witnesses:
J. F. BOLDING,
C. H. BOCOCK.